UNITED STATES PATENT OFFICE.

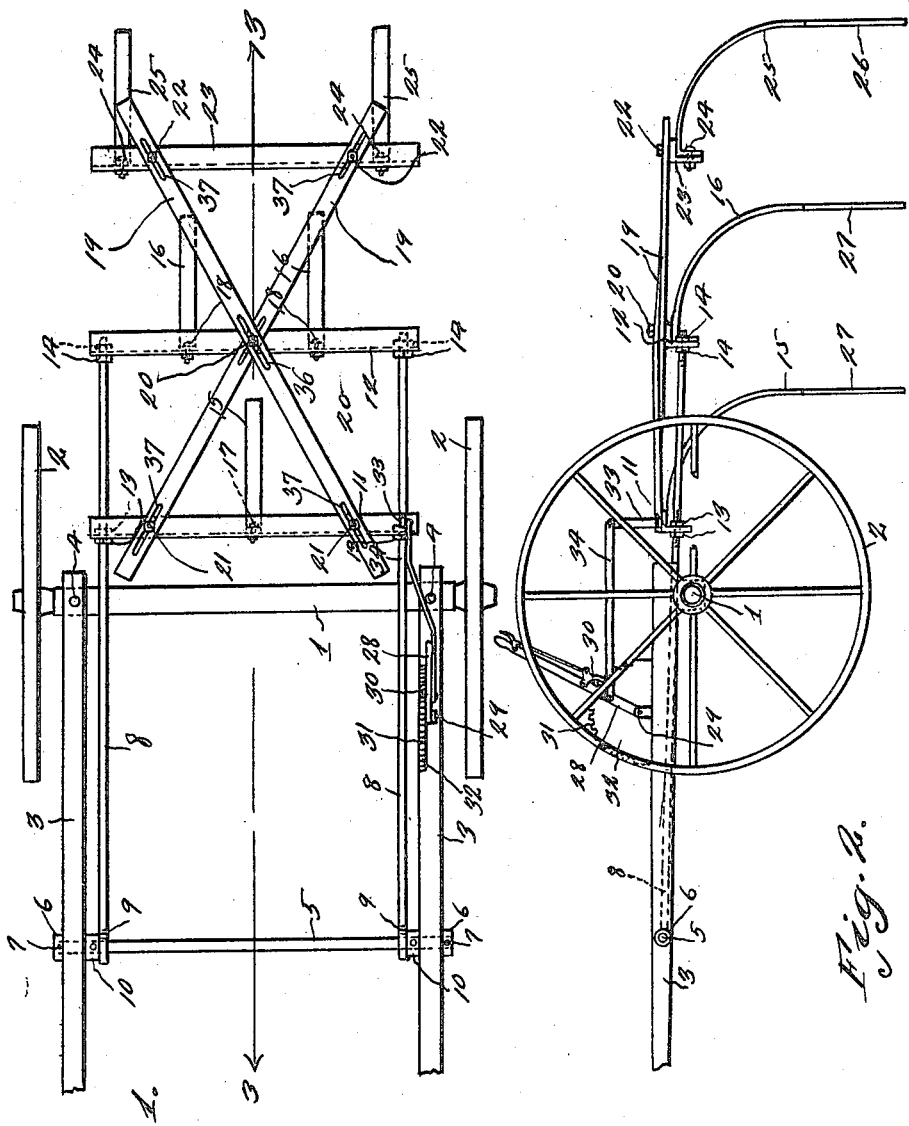

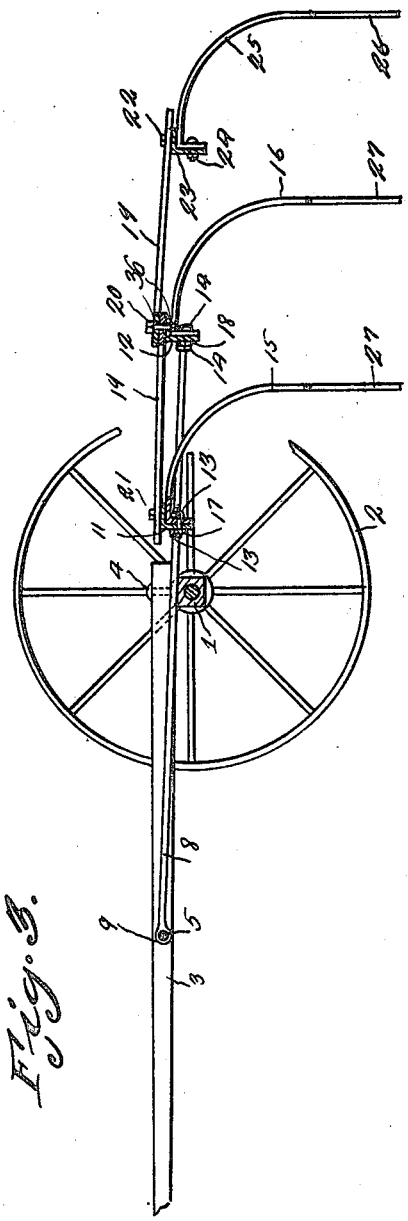
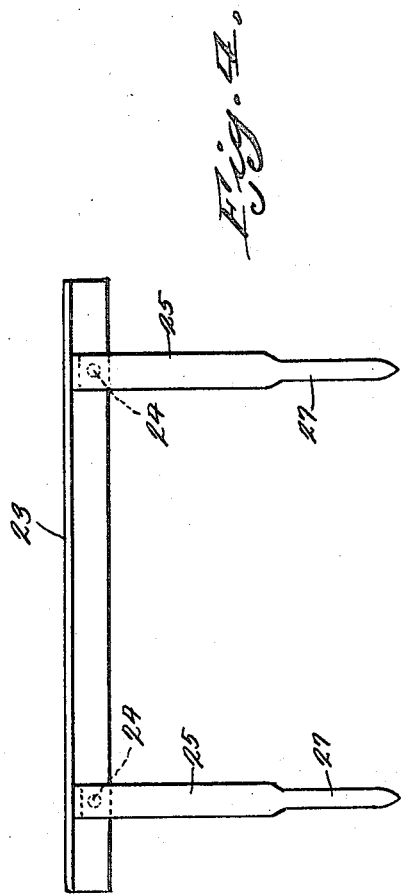

HAROLD DICKINSON, OF FENNVILLE, MICHIGAN.

AUXILIARY ATTACHMENT FOR RIDING-CULTIVATORS.

1,323,029.  Specification of Letters Patent.  Patented Nov. 25, 1919.

Application filed June 24, 1918. Serial No. 241,569.

*To all whom it may concern:*

Be it known that I, HAROLD DICKINSON, a citizen of the United States, residing at Fennville, in the county of Allegan, State of Michigan, have invented a new and useful Auxiliary Attachment for Riding-Cultivators; and I do hereby declare the following to be a full, clear, and exact description of the invention, such as will enable others skilled in the art to which it appertains to make and use the same.

This invention relates to an improved auxiliary harrow or cultivator attachment adapted for use in connection with riding cultivators or harrows.

It has been found that the teeth of a cultivator being flat faced and more or less rigidly attached to the machine, as is necessary for the labor they are to perform, (loosening the hard earth about the plant, and destroying the weeds between the rows) cannot be arranged to pass immediately over and about the plant, for in doing so, they would be destroyed, and so must pass on either side of the plant, which not only leaves a narrow strip about the plant not being loosened and without removing the weeds, but also necessarily throws up over and against the young plants, hard chunks of earth which injure them and retard their growth.

Therefore, an object of the present invention is to provide an attachment for use in connection with a riding cultivator or harrow to overcome the aforesaid conditions.

A further object of the invention is to provide an attachment which is very simple, efficient and practical and may be easily attached and detached by means of hooks or the like (it depending on the make of the cultivator or other machine) to and from the machine.

A further object of the invention is to provide an attachment of this kind entirely different from others for the same use, whereby it will follow immediately back of the center of the machine and being light in weight and non rigid, and the teeth being flat where they engage the strip of soil (which is left uncultivated by the usual cultivator teeth) will thoroughly till or agitate the soil immediately adjacent the base of the young plants. By virtue of the particular construction of the attachment and its position when in use, the soil will be thrown from either side from the young plants. Furthermore owing to a proper balance of the weight of the attachment, the weeds immediately about the plants will be thoroughly destroyed without injuring the plant, and it is to be further noted that the weeds, sticks and the like will not be gathered, but on the contrary thrust or thrown to one side, as well as the hard chunks of earth or soil.

In practical fields the details of construction may necessitate alterations falling within the scope of what is claimed.

The invention comprises further features and combination of parts as hereinafter set forth shown in the drawings and claimed.

In the drawings:—

Figure 1 is a plan view of the attachment as applied to a frame of a cultivator, the parts of the cultivator being eliminated.

Fig. 2 is a view in side elevation.

Fig. 3 is a sectional view on line 3—3 of Fig. 1.

Fig. 4 is a rear view of the supporting bar of the rearmost teeth of the attachment.

Referring more especially to the drawings 1 designates a conventional form of axle, on which supporting wheels 2 are mounted. Side bars 3 are secured at 4 to the axle 1, and extending across the side bar beyond the axle 1 is a rod 5, secured in place against endwise movement by the collars 6, which are secured on the rod by the pins 7. Rods 8 have their eyes 9 pivotally engaging the rod 5, there being spacing collars 10 spacing the rods 8 from the bars 3. Connecting the rear ends of the rods 8 are transverse angle bars 11 and 12, through the vertical flanges of which the rods 8 pass, there being nuts 13 and 14 threaded on the rods for holding the transverse bars 11 and 12 in adjusted positions. Harrow or cultivating teeth 15 and 16 are secured by means of the bolts 17 and 18 to the bars 11 and 12. There are two teeth 16 carried by the bar 12, and a single tooth or cultivator member 15 is carried by the bar 11. The tooth 15 is in advance of the teeth 16, which engage the soil on each side of where the soil is engaged by the tooth 15. In order to attain this result the teeth 15 and 16 extend rearwardly and curve rearwardly and downwardly to contact with the soil. Beams 19 are adjustably secured by bolts 20 and 21 to the bars 12 and 11. These beams are disposed so as to intersect or cross each other and secured to their rear extremities by bolts 22 is a transverse bar 23. This transverse bar 23 has secured to its vertical flange by bolts 24, teeth 25, which teeth extend rearwardly and are curved downwardly to engage the soil on each side of where the soil is engaged by the teeth 16. These teeth 25 terminate in flat lower parts, the terminals of which engage the soil immediately adjacent the base of the plants and act to agitate or till the soil and throw the weeds, sticks and the like to one side from the plants. The teeth 15 and 16 also terminate in flat lower parts 27, which act to till the soil. Since the bars are pivoted on the rod 5 and are supported upon the axle 1, it is to be noted that the teeth will easily ride over the soil. In other words the attachment is not rigid in its action. A lever 28 is pivoted at 29 to one of the side bars 3 and has a grip operated dog 30 engaging the teeth 31 of the segment rack 32. An arm 33 extends upwardly from the bar 11, and a link 34 connects between the arm and the lever 28 whereby upon moving the lever forwardly, it is to be seen that the cultivator attachment may be raised and lowered manually. By means of slots 36 formed in the centers of the intersecting bars 19, and at the ends of said bars as shown at 37, and through which the bolts 20, 13 and 22 pass, the transverse bars 11, 12 and 23 may be adjusted toward and from each other.

When the cultivator is being used in a position wherein it is straddling a row of plants, the tooth 15 is removed, thereby allowing the plant to pass between the teeth 16 and the teeth 25. However, if the ground between the plants is being cultivated the tooth 15 may be retained.

The invention having been set forth what is claimed as new and useful is:—

An auxiliary attachment for cultivators comprising a transversely disposed bar having a series of cultivating arms attached thereto, a pair of crossed bars having slots therein at their ends, means for adjustably securing one of the ends of each cross bar to the transversely disposed bar of the auxiliary cultivator, means for securing the other ends adjustably to the cultivator frame, slots in the body of each cross bar and centrally disposed in relation to the slots at the ends of each cross bar, said centrally disposed slots being so disposed as to cross each other at the crossing point of the bars and means passing through said centrally disposed slots for adjustably securing the cross bars at their points of intersection to the cultivator frame.

In testimony whereof I have signed my name to this specification in the presence of two subscribing witnesses.

HAROLD DICKINSON.

Witnesses:
 WALTER A. PULLMAN,
 WM. VAN BLAIR.